(12) United States Patent
Miyagawa et al.

(10) Patent No.: US 7,025,572 B2
(45) Date of Patent: Apr. 11, 2006

(54) COMPRESSOR WITH INTEGRAL CONTROL UNIT

(75) Inventors: Kazuhito Miyagawa, Kariya (JP); Yasutane Hijikata, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/201,192

(22) Filed: Jul. 24, 2002

(65) Prior Publication Data

US 2003/0021699 A1 Jan. 30, 2003

(30) Foreign Application Priority Data

Jul. 25, 2001 (JP) ............................. 2001-224652

(51) Int. Cl.
*F04B 29/00* (2006.01)
*F25B 49/00* (2006.01)

(52) U.S. Cl. .................... 417/223; 62/133; 62/228.5

(58) Field of Classification Search ................ 417/223; 62/133, 208, 209, 229, 230, 228.1, 228.4, 62/228.5, 244, 243, 323.1, 323.4, 196.1, 62/196.2

See application file for complete search history.

(56) References Cited

U.S. PATENT DOCUMENTS

| | | | | |
|---|---|---|---|---|
| 4,677,830 A | * | 7/1987 | Sumikawa et al. | 62/126 |
| 4,976,589 A | * | 12/1990 | Ide | 417/34 |
| 5,018,362 A | * | 5/1991 | Nagase et al. | 62/133 |
| 5,385,029 A | * | 1/1995 | Yamanaka et al. | 62/133 |
| 5,724,941 A | * | 3/1998 | Suzuki et al. | 123/339.15 |
| 5,761,917 A | * | 6/1998 | Corcoran et al. | 62/133 |
| 5,893,272 A | * | 4/1999 | Hanselmann et al. | 62/133 |
| 5,924,296 A | * | 7/1999 | Takano et al. | 62/133 |
| 6,393,849 B1 | * | 5/2002 | Takenaka et al. | 62/133 |
| 6,484,520 B1 | * | 11/2002 | Kawaguchi et al. | 62/133 |

FOREIGN PATENT DOCUMENTS

| | | | | |
|---|---|---|---|---|
| JP | | 05099156 A | * | 4/1993 |
| JP | | 05099157 A | * | 4/1993 |
| JP | | 10038717 A | * | 2/1998 |
| JP | | 2001073941 A | * | 3/2001 |

* cited by examiner

*Primary Examiner*—Charles G. Freay
(74) *Attorney, Agent, or Firm*—Posz Law Group, PLC (57) ABSTRACT

A compressor for a vehicle air conditioner includes a pressure sensor and a torque computing unit for computing the compressor torque. The compressor also has a communication unit that allows data communication with other devices based on vehicle data communication protocols. The torque computing unit and the communication unit are integral with the compressor. Therefore, it is possible to calculate the driving torque quickly, and an engine electronic control unit can control an engine such that the torque required for the compressor can be quickly generated.

11 Claims, 5 Drawing Sheets

COMPRESSOR WITH INTEGRAL CONTROL UNIT

CROSS REFERENCES TO RELATED APPLICATIONS

This application relates to and incorporates by reference Japanese patent application No. 2001-224652, which was filed on Jul. 25, 2001.

BACKGROUND OF THE INVENTION

The present invention relates to a compressor that is driven by a power source (a vehicle engine), and in particular, to a vehicle air-conditioner compressor with an integral control unit.

As described in Japanese unexamined patent publication No. 2001-7341, a typical vehicle air-conditioner includes a compressor, a condenser, a decompressor, an evaporator, and an AECU (air-conditioner electronic control unit) for controlling an electromagnetic clutch, which engages and disengages the compressor, a variable capacity mechanism, cabin units installed in the passenger compartment, such as an air mix door and a blower mode door, and the like. The AECU controls the operation of the compressor on the basis of the air-conditioning heat load (i.e., the refrigerating capacity of the evaporator, which can be determined by the actual temperature of the passenger compartment or by a temperature selected by the vehicle's occupants).

Despite the fact that the air conditioner (i.e., the compressor) is driven by the engine, generally, the AECU does not take into account the vehicle-running state (i.e., the load on the engine). That is, generally, air conditioners (compressors) are controlled on the basis of the air-conditioning load.

However, the air conditioner (the compressor) consumes the most power of the accessories driven by the engine. Therefore, the variations in the load of the air conditioner (the compressor) have a great influence on the performance of the vehicle.

On the other hand, it has been proposed to perform variable control of the compressor (a discharge volume control or control of the time of engagement of the electromagnetic clutch) in response to a request from an EECU (engine electronic control unit), which controls the engine. In this case, however, since the compressor is controlled by the AECU, the EECU is forced to generate a command for changing (curtailing) the output of the compressor to the AECU.

For the AECU, however, the request from the EECU is provided as an interruption request and is not included in a routine typically performed for air-conditioning control, so that such a request from the EECU will be handled after completing the typical air-conditioning control routine. Thus, the request from the EECU cannot be quickly handled.

In general, furthermore, the air conditioner has a pressure sensor on the output side of the condenser for detecting the pressure of the refrigerant to make a judgment as to whether the driving torque of the compressor is appropriate and whether an abnormality has occurred in the air conditioner (i.e., whether the pressure on the high-pressure side is abnormally high). Therefore, there is a need to consider the pressure loss in the condenser. In other words, the pressure loss to be considered is different for each kind of vehicle. Thus, it has been difficult to decrease the number of steps in the process for developing the air conditioner.

SUMMARY OF THE INVENTION

In view of the facts described above, an object of the present invention is to provide a compressor that allows, for example, simple control of engine torque to improve the fuel efficiency of a vehicle while improving the performance of the vehicle.

A first aspect of the present invention is to provide a compressor driven by a power source. The compressor includes: a pump mechanism for drawing and discharging a fluid; torque detecting means for detecting driving torque of the pump mechanism; control means for controlling the pump work of the pump mechanism; and communication means for communicating with other devices to transmit the driving torque detected by the torque detecting means and to receive a command signal for the control means.

In the compressor, therefore, the driving torque can be computed by the compressor itself, so that the computation of the driving torque can be performed more quickly compared with the computation of driving torque performed by an air conditioner electronic control unit.

In addition, the computed driving torque can be transmitted from the compressor to other devices. Therefore, when the computed driving torque is transmitted to an EECU (control unit for controlling the driving power source), the EECU can control the power source such that torque corresponding to the torque required by the compressor (the pump mechanism) can be quickly produced by the power source.

Furthermore, the pump work of the compressor can be controlled by the compressor itself. Therefore, the compressor is capable of quickly responding to a request from the EECU (e.g., a command for curtailing the pump work).

Therefore, using the compressor of the present invention, the torque to be produced by the power source can be easily controlled to improve the fuel efficiency and performance of the vehicle.

Information about the discharge pressure of the compressor is determined at the time of computing the driving torque. Therefore, for example, the compressor of the present invention can be used in an air conditioner, and there is no need to additionally provide a pressure sensor on the refrigerant exit side of a condenser. As a result, there is no need to consider the fact that each kind of vehicle has a different pressure loss, so that the number of steps for developing the air conditioner is reduced.

According to the present invention, as described above, the number of steps for developing the air conditioner can be decreased while improving the performance of the vehicle.

In a second aspect of the present invention, at least the pump mechanism, the torque detecting means, the control means, and the communication means are parts of an integral unit.

Furthermore, according to a third aspect of the present invention, the control means may have a variable capacity mechanism, which alters the discharge volume of the pump mechanism, and a control unit, which electrically controls operation of the variable capacity mechanism.

In addition, according to a fourth aspect of the present invention, the control means may include an electromagnetic clutch, which intermittently transmits power to the pump mechanism, and a control circuit, which controls the electromagnetic clutch.

According to a fifth aspect of the present invention, when a value detected by the torque detecting means is beyond a predetermined limit, the control means may transmit a signal to the other devices through the communication means.

According to a sixth aspect of the present invention, the communication means may be based on vehicle data communication protocols.

Accordingly, an existing communication cable can be used, so that there is no need to additionally construct a specific communication cable for data communication. Therefore, the number of communication cables in the vehicle can be decreased.

DETAILED DESCRIPTION OF THE PREFERRED EMBODIMENTS

Figure 1:
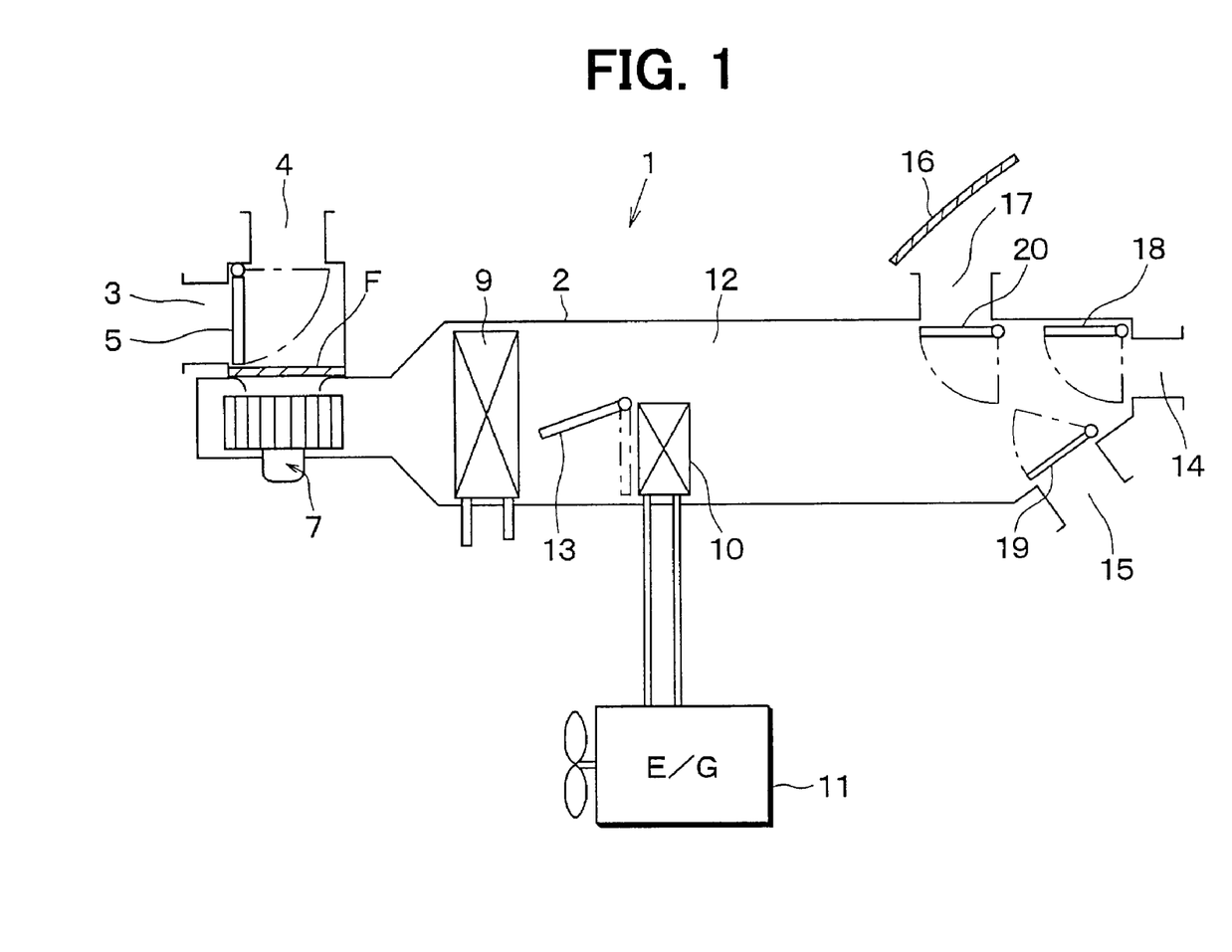
FIG. 1 is a block diagram of a vehicle air conditioner in accordance with a preferred embodiment of the present invention.

In the present invention, a compressor of the present invention applied to a vehicle air conditioner (a vapor compression refrigerating system) will be described. FIG. 1 is a schematic diagram showing the vehicle air conditioner 1 of the present invention.

An air conditioner 1 has a case 2, which forms an air passage. An upstream end of the case 2 includes an inside air inlet 3, for receiving air from the passenger compartment, an outside air inlet port 4, for receiving outside air, and an inlet port switching door 5, for adjusting the opening ratio between the inside inlet 3 and the outside inlet 4.

Downstream of the inlet port switching door 5 is a filter F, for removing dust in the air, and a centrifugal type blower 7. The air from the inlets 3, 4 is sent by the blower 7 to three air outlet ports 14, 15, 17. An evaporator 9, which removes heat from air, is located on the downstream side of the blower 7. The entire volume of the air being sent from the blower 7 passes through the evaporator 9.

In addition, a heater core 10 is provided for heating the air and is located downstream of the evaporator 9. The heater core 10 heats the air using coolant fluid from the engine 11 as a heat source. The evaporator 9 is a heat exchanger on the low pressure side of the vapor compression refrigerating circuit. The evaporator 9 cools by evaporating refrigerant. The refrigeration circuit will be described later.

In addition, a bypass passage 12 for bypassing the heater core 10 is formed on the case 2 of the air conditioner 1. Upstream of the heater core 10, there is an air-mixing door 13, which adjusts the ratio of the amount of airflow passing through the heater core 10 and the amount of airflow flowing through the bypass passage 12. Adjustment of the airflow ratio is performed by adjusting the position of the air mixing door 13.

The downstream portion of the case 2 includes a face outlet port 14 for sending air-conditioned air to the upper body of a passenger, a foot outlet port 15, for sending air to legs of the passenger, and a defroster outlet port 17, for sending air to the inner side of a windshield 16.

Figure 2:
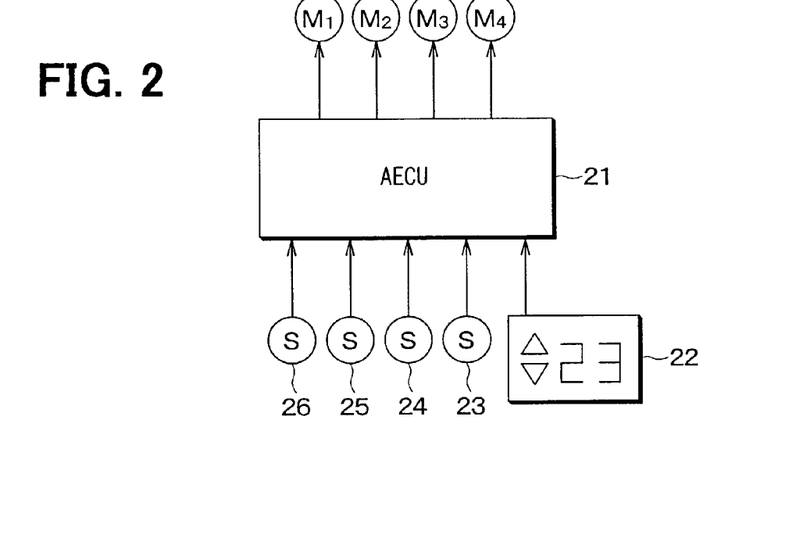
FIG. 2 is a block diagram of a control system of the vehicle air conditioner of FIG. 1.

On the upstream side of each of the air outlet ports 14, 15, and 17, is an outlet adjustment door 18, 19, 20 for adjusting the opening of the corresponding outlet port 14, 15, 17. Furthermore, the outlet adjustment doors 18, 19, 20, the inlet port switching door 5, and the air-mixing door 13 can be opened and closed by driving means M1, M2, and M4, which are, for example, servo motors. Also the driving means M1, M2, and M4 and the blower 7 (the motor M3 of the blower 7) can be controlled by the AECU 21, as shown in FIG. 2.

Figure 3:
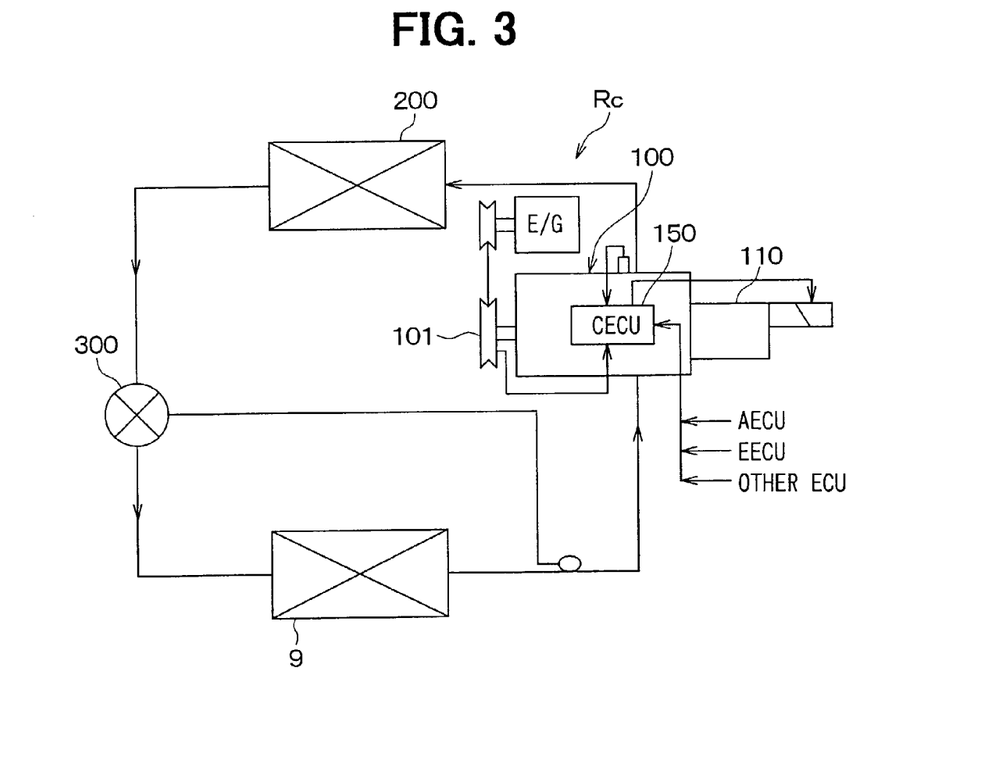
FIG. 3 is a block diagram of a refrigerating circuit of the vehicle air conditioner of FIG. 1.
Figure 4:
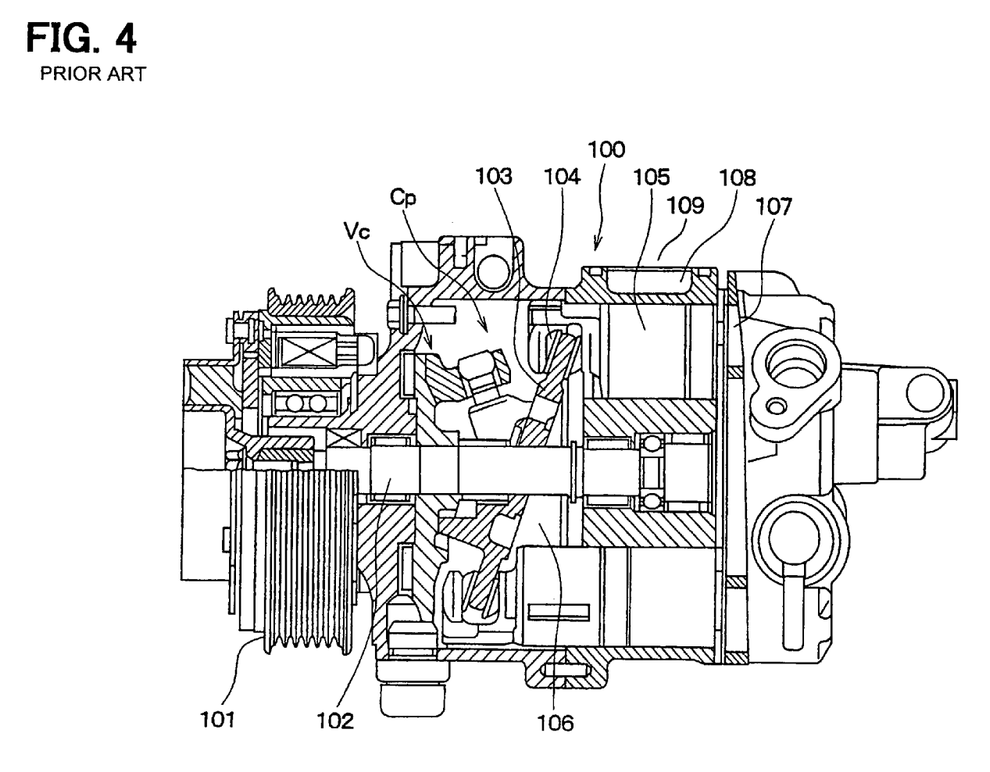
FIG. 4 is a cross sectional diagram of a compressor of the vehicle air conditioner of FIGS. 1–3.

Next, the vapor compression refrigerating circuit will be described. FIG. 3 shows the vapor compression refrigerating circuit Rc. Reference numeral 100 denotes a compressor for drawing and compressing refrigerant. The compressor 100 is driven by a vehicle-driving engine E/G. As shown in FIG. 4, the compressor 100 is driven through an electromagnetic clutch 101, which intermittently transmits power. The compressor 100 will be described in more detail later.

In FIG. 3, reference numeral 200 denotes a condenser (radiator) for cooling and condensing refrigerant by transferring heat to the outside air from high temperature and high pressure refrigerant that has been discharged from the compressor 100. Reference numeral 300 denotes a decompressor, which depressurizes the refrigerant that has exited the condenser 200. The decompressor 300 is a so-called thermostatic expansion valve, which regulates the size of its opening such that the degree of heating of the refrigerant on the outlet side of the evaporator 9 is controlled to a predetermined value.

Furthermore, the following information is sent to the AECU 21. That is, inputs to the AECU include: a selected temperature Tset of a temperature selector 22, which is the temperature set by a passenger; a detected temperature Tin, which is the temperature of the air in the passenger compartment as detected by an inside-air temperature sensor 23; a detected temperature Tout, which is the temperature of the outside air as detected by an outside-air temperature sensor 24; a detected magnitude of solar radiation radiated into the passenger compartment as estimated by a solar radiation sensor 25; a detected temperature Te of the air just downstream of the evaporator 9 as detected by an evaporator air temperature sensor 26; and the like. Furthermore, the temperature sensors 23, 24, and 26 employ thermistors or the like in which electrical resistance varies according to temperature.

Next, the compressor 100 will be described in detail. As shown in FIG. 4, the compressor 100 is a well-known variable-capacity type swash plate compressor. A swash plate 103 is inclined with respect to a shaft 102. The swash plate 103 is coaxial to and is rotated together with the shaft 102 to reciprocate a plurality of pistons (six pistons in this embodiment) 105, which are connected to the swash plate 103 through shoes 104 to form a compressor mechanism Cp. The pistons 105 are fitted in cylinders Vc, respectively. Therefore, the volume of each cylinder Vc can be repeatedly increased and decreased to draw and compress the refrigerant.

When it is required to change the discharge volume of the compressor 100, the pressure in the swash plate chamber (control pressure chamber) 106, in which the swash plate 103 is housed, may be changed to alter the stroke of the pistons 105. That is, the pressure in the swash plate chamber 106 controls the inclination angle of the swash plate 103, and the inclination angle controls the stroke of the pistons 105. The swash plate chamber 106 communicates with the suction chamber of the compressor through a passage, which is restricted by throttle device such as an orifice. The pressure in the swash plate chamber 106 can be controlled by controlling the flow of refrigerant between the swash plate chamber 106 and the discharge chamber of the compressor. The mechanism that changes the inclination angle of the swash plate 103 will be referred to as a variable capacity mechanism Vc.

The compressor includes a first discharge chamber 107, which reduces pressure pulsation and recovers refrigerant discharged from each cylinder Vc, and a second discharge chamber 108, which conducts refrigerant from the first discharge chamber 107 to a discharge port 109. The discharge chambers 107, 108 are connected through a communication passage (not shown) with a predetermined diameter. Therefore, pressure loss can be generated when the refrigerant passes through the communication passage, and the pressure in the second discharge chamber 108 is thus lower than the pressure in the first pressure chamber 107.

Figure 5:
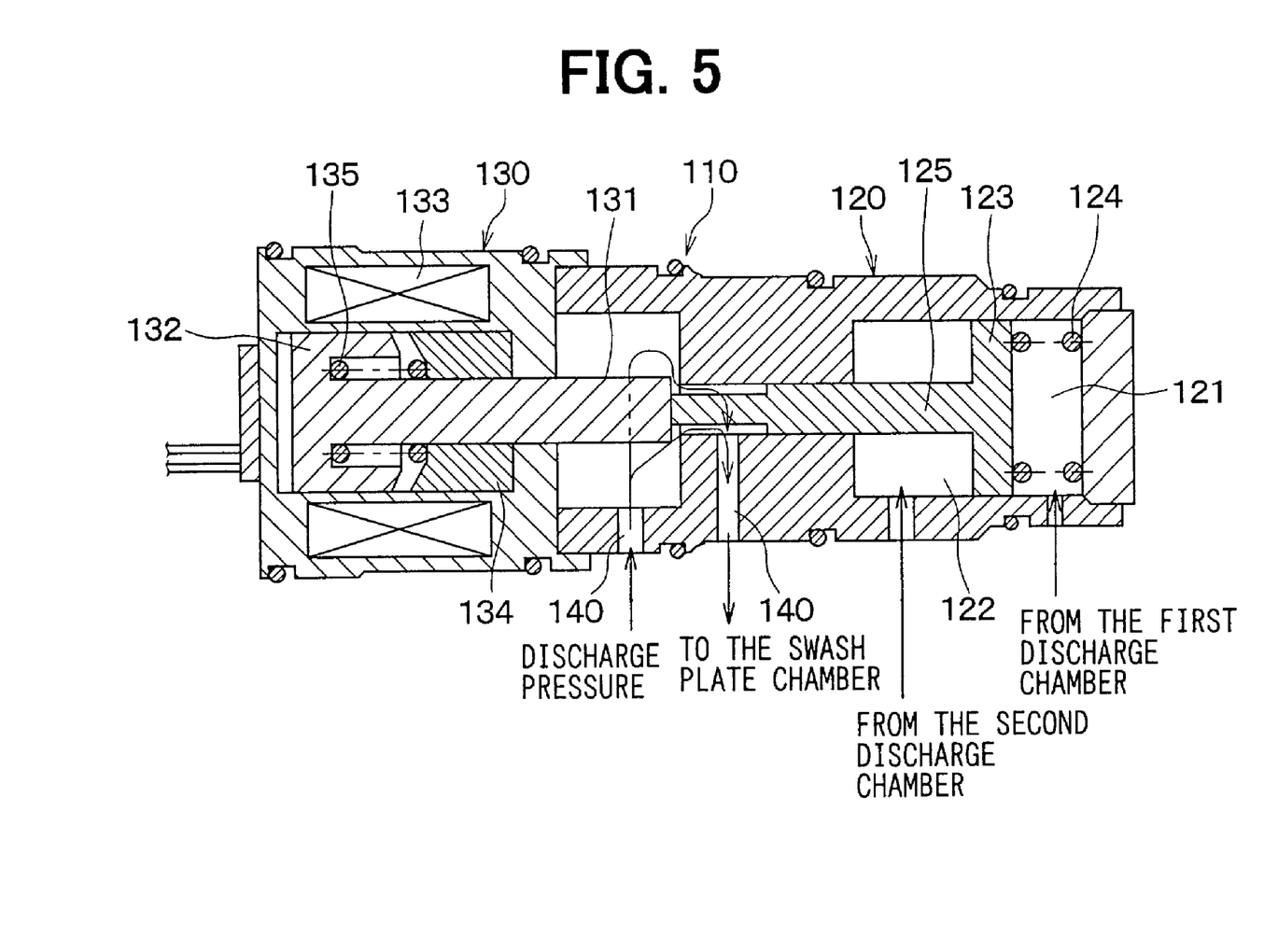
FIG. 5 is a cross sectional diagram of a control valve of the compressor of FIG. 4.

FIG. 5 is a cross sectional view of a control valve 110, which controls the pressure in the swash plate chamber 106. The control valve 110 includes a first control unit 120, which is operated such that the pressure difference between the first discharge chamber 107 and the second discharge chamber 108 is directed to a predetermined pressure difference (a control target pressure difference) $\Delta p$, and a second control unit 130 for controlling the control target pressure difference $\Delta p$ by restricting the operation of the first control unit 120.

First, the first control unit 120 will be described. The control unit 120 includes a first control chamber 121, to which the pressure in the first discharge chamber 107 is applied. A second control chamber 122, to which the pressure in the second discharge chamber 108 is applied, is also formed in the first control unit 120. The control chambers 121, 122 are separated from each other by a control piston 123. In the first control chamber 121, there is a coil spring 124 for applying force to push the piston 123 in the direction in which the volume of the first control chamber 121 is increased. A push rod 125, which is joined to the piston 123, receives the force of the coil spring 124 and the force resulting from the pressure differential between the control chambers 121, 122. The force on the push rod 125 is applied in the direction (toward the left in FIG. 5) in which the volume of the first control camber 121 is increased, since the pressure of the first control chamber 121 is larger than that of the second control chamber 122. The movement of the push rod 125 is negligible, thus the force exerted on the piston 123 (the push rod 125) by the coil spring 124 can be regarded as substantially constant. The force on the push rod 125 is applied to a valve body 131 and is a valve opening force.

The second control unit 130 exerts a valve-closing force, which is opposed to the valve-opening force, on the valve body 131. The valve body 131 regulates a control pressure passage 140, through which discharged refrigerant flows (from the second discharge chamber 108) to the swash plate chamber 106. Therefore, the valve body 131 regulates the pressure of the swash plate chamber 106.

A plunger (a movable iron core) 132 is moved by an electromagnetic attraction force of a magnetic field that is produced by an excitation coil 133. A stopper (a fixed iron core) 134 is adjacent to the plunger, as shown in FIG. 5. The plunger 132 and the stopper 134 are attracted to each other when the coil 133 is excited. In addition, a coil spring 135 applies a force that is opposite to the electromagnetic attraction force. Since the movement of the plunger 132 is negligible, the force exerted by the coil spring 135 on the plunger 132 can be regarded as substantially constant.

The plunger 132 and the valve body 131 are integral, and the valve-closing force (the electromagnetic attraction force) is roughly proportional to a duty ratio of electric power application to the excitation coil 133. Thus, the valve-closing force is regulated by controlling the duty ratio of the coil 133.

Therefore, when the valve-closing force is increased by increasing the duty ratio, the valve body 131 is shifted toward the right in FIG. 5 to throttle the control pressure passage 140. As a result, the pressure in the swash plate chamber 106 decreases and the discharge volume of the compressor 100 increases. On the other hand, when the valve-closing force is decreased by reducing the duty ratio, the valve body 131 is shifted to the left in FIG. 5 to open the control pressure passage 140. As a result, the pressure in the swash plate chamber 106 increases and the discharge volume of the compressor 100 decreases.

When the engine speed increases, the speed of the compressor 100 increases, and the flow rate of refrigerant discharged from the compressor 100 increases. When the discharge flow rate of the compressor 100 increases, the pressure difference between the first and second control chambers 121, 122 increases. Therefore, the push rod 125 and the valve body 131 are shifted to the left in FIG. 5, which opens the control pressure passage 140, which decreases the discharge volume of the compressor 100.

On the other hand, when the engine speed decreases, and the speed of the compressor 100 decreases accordingly, the discharge flow rate of refrigerant from the compressor 100 decreases. When the discharge flow rate of the compressor 100 decreases, the pressure difference between the first and second control chambers 121, 122 decreases. Therefore, the push rod 125 and the valve body 131 are shifted to the right in FIG. 5, which restricts, or throttles, the control pressure passage 140, and the discharge volume of the compressor 100 is increases as a result.

The valve body 131 moves to a position at which the valve-closing force and the valve-opening force are balanced. Since the forces exerted by the coil springs 124, 135 are constant, the discharge volume of the compressor 100 is mechanically varied until the pressure difference between the first and second control chambers 121, and 122 reaches the predetermined pressure difference (i.e., the control target pressure difference $\Delta p$) which can be uniquely defined by the valve-closing force (the electromagnetic attraction force).

Therefore, by controlling the duty ratio, the flow rate of the refrigerant actually discharged from the compressor 100 can be controlled independently of the rotational speed of the engine E/G (the speed of the compressor 100). Therefore, in the present embodiment, the flow rate of the discharged refrigerant, which is determined by the duty ratio of the coil 133, is referred to as the target flow rate of the discharged refrigerant. The determination of the duty ratio is thus also a determination of the target flow rate of the discharged refrigerant.

As shown in FIG. 3, the duty ratio for applying electric power to the excitation coil 133 and the ON-OFF control of the electromagnetic clutch 101 are controlled by a dedicated ECU, or CECU (compressor-dedicated electronic control unit) 150, which is integrated with the compressor 100. In this embodiment, the CECU 150 is mounted on a portion of the compressor 100 at which refrigerant with a comparatively low temperature is circulated, for cooling the CECU 150.

Figure 6:
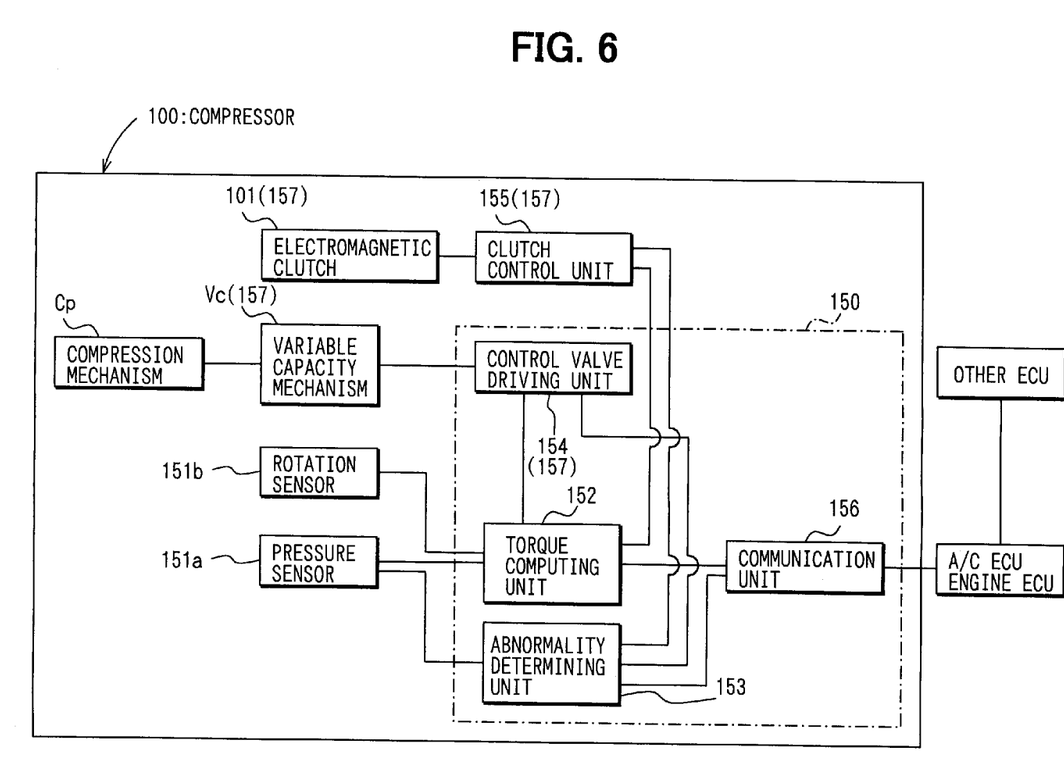
FIG. 6 is a block diagram of the compressor of FIG. 4.

The CECU 150 receives a detection signal representing the pressure of the refrigerant in the second discharge chamber 108 from a pressure sensor 151a and a signal representing the rotational speed of the compressor 100 from a rotation sensor 151b. The CECU 150 further includes the following: a torque computing unit 152 for computing the torque for driving the compressor 100 in response to the output signal of the pressure sensor 151a; an abnormality determining unit (abnormality determining means) 153 for determining whether there is an abnormality in the refrigerating circuit Rc based on the output signal of the discharge pressure sensor 151a (e.g., a determination of whether the discharge pressure is abnormally high); a control valve driving unit 154 that sends a duty signal to the excitation coil 133; a clutch control unit 155 for generating an ON-OFF signal to be transmitted to the electromagnetic clutch 101; and a communication unit 156 for sending and receiving various signals between the AECU 21 and the EECU (engine electronic control unit). The various signals transmitted between the AECU 21 and the EECU include data representing the driving torque computed by the compressor torque computing unit 152, a command signal to the control valve driving unit 154, and an abnormality signal when the high pressure abnormality is detected by the abnormality determining unit 153.

Furthermore, when the abnormality determining unit 153 detects a high pressure abnormality (i.e., when the output value of the pressure sensor 151a is outside of a predetermined range), an abnormality determination signal is generated for instructing the clutch control unit 155 to block power transmission, a signal is produced for instructing the control valve driving unit 154 to decrease the discharge volume, or the like to prevent the discharge pressure from increasing further.

The torque computing unit 152 calculates the compressor torque by dividing the product of the compressor discharge pressure Pd (the output value of the pressure sensor 151a) and the discharge capacity (the duty ratio for applying electric power on the excitation coil 133) by the rotational speed of the compressor 100 (the output value of the rotation sensor 151b).

The communication unit 156 is capable of transmitting and receiving data signals based on vehicle data communication protocols. Therefore, the driving torque of the compressor 100 can be transmitted to the EECU, AECU, or the like according to vehicle data communication protocols.

As is evident from the above description, the compression power (the rate of pump work) of the compressor 100 can be controlled by controlling the variable capacity mechanism Vc with the control valve 110 or by subjecting the electromagnetic clutch 101 to ON-OFF control. Therefore, the control valve 110, the variable capacity mechanism Vc, the control valve driving unit 154, the electromagnetic clutch 101, and the clutch control unit 155 can be collectively called a power control unit (control means) 157.

Next, the characteristic features of the present embodiment will be described. In the present embodiment, the compressor 100 can compute its driving torque. Therefore, the calculation of the driving torque can be performed more quickly compared with computing the driving torque with the AECU 21.

In addition, the computed driving torque can be transmitted from the compressor 100 to the EECU. Therefore, the EECU can control the engine such that torque corresponding to the torque required by the compressor 100 can be quickly produced by the engine.

Furthermore, the compression power (the rate of pump work) of the compressor 100 can be controlled by the compressor 100 itself. Therefore, the compressor 100 is capable of quickly responding to a request from the EECU (e.g., a command for curtailing the compression power).

Therefore, using the compressor 100 of the present embodiment, torque generated by the engine can be easily controlled to improve the fuel efficiency of a vehicle while improving the performance of the vehicle.

Moreover, information about the discharge pressure Pd is known at the time of computing the driving torque. The compressor 100 of the present embodiment includes means for computing the driving torque. Therefore, there is no need to provide a pressure sensor on the downstream side of the condenser 200. As a result, there is no need to consider the fact that each vehicle type has pressure loss different from others, and that the number of steps for developing the air conditioner can be decreased.

The pressure sensor 151a, the rotation sensor (the rotational speed detector) 151b, and the CECU 150 are integrally mounted on the compressor 100, so the number of wires such as lead wires for the sensors 151a, and 151b can be minimized.

The communication unit 156 is constructed to transmit and receive data signals based on vehicle data communication protocols. Therefore, an existing communication cable can be used, and that there is no need to additionally construct a specific communication cable for the data communications between the CECU 150 and the AECU 21 or the EECU or the like. Therefore, the number of communication cables in the vehicle can be decreased, and the number of structural components of the vehicle and the number of steps for manufacturing the vehicle are reduced.

OTHER EMBODIMENTS

In the above embodiment, both the electromagnetic clutch 101 and the variable capacity mechanism Vc are controlled by the CECU 150. However, the present invention is not limited to such a configuration, and it may be that only one of these two is controlled by the CECU.

In the illustrated embodiment, furthermore, the compressor is a variable-capacity type compressor. The present invention is not so limited, and any type of compressor may be employed, such as a fixed capacity type or a scroll type compressor.

The invention claimed is:

1. A compressor, which is driven by a driving power source, comprising:
   a housing;
   a pump mechanism housed in the housing for drawing and disengaging fluid;
   a pump work altering mechanism attached to the housing for altering pump work of the pump mechanism; and
   an electric circuit unit attached on the housing and including:
   a sensor for detecting a signal indicating pump torque of the pump mechanism;
   a torque operating circuit for processing the detected signal of the sensor and outputting an operated signal;
   a control circuit for controlling the pump work via the pump work altering mechanism; and
   a communication circuit for communicating with both a control device, which is disposed separately from the compressor, and the torque operating circuit, wherein the communication circuit communicates with the control device for transmitting the operated signal of the torque operating circuit and receiving a command signal to control the pump mechanism via the pump work altering mechanism, and the control circuit controls the pump work via the pump work altering mechanism based on the operated signal of the torque operating circuit, and wherein the communication circuit communicates according to a vehicle data communication protocol.

2. The compressor according to claim 1, wherein the control circuit transmits a signal to the other device through the communication circuit when an output value of the torque detecting means is beyond predetermined limit.

3. The compressor according to claim 1, wherein the other control device is an engine control circuit.

4. The compressor according to claim 3, wherein the engine control circuit controls an engine such that the engine provides a driving torque to the compressor based on driving torque information sent to the engine control circuit from a compressor torque control circuit through a communication circuit.

5. The compressor according to claim 4, wherein the workload of the compressor is controlled by the compressor torque control circuit based on a command signal from the engine control circuit.

6. A compressor according to claim 1, wherein said sensor includes a pressure sensor for measuring an internal pressure of the housing.

7. A compressor according to claim 6, wherein said sensor further include a rotation sensor for measuring to rotational speed of the compressor.

8. A compressor according to claim 1, wherein said pump work altering mechanism is a variable capacity mechanism, which alters the discharge volume of the pump mechanism.

9. A compressor according to claim 1, wherein said pump work altering mechanism is an electromagnetic clutch, which intermittently transmits power to the pump.

10. A refrigerating circuit having compressor according to claim 8, further comprising: an abnormality determining unit for determining whether there is an abnormality in the refrigerating circuit based on the detected signal of the sensor, and when the abnormality determining unit detects an abnormality in the refrigerating unit, the abnormality unit generates an abnormality determination signal for instructing the control unit to decrease the discharge volume of to pump mechanism via the variable capacity mechanism.

11. A refrigerating circuit having a compressor according to claim 9, further comprising: an abnormality determining unit for determining whether there is an abnormality in the refrigerating circuit based on the detected signal of the sensor, and when the abnormality determining unit detects an abnormality in the refrigerating unit, the abnormality unit generates an abnormality determination signal for instructing the control unit to block power transmission via the electromagnetic clutch.

* * * * *